(12) United States Patent
Ancuta et al.

(10) Patent No.: US 8,098,145 B2
(45) Date of Patent: Jan. 17, 2012

(54) TRAILER DETECTION APPARATUS AND METHOD

(75) Inventors: Mircea Florin Ancuta, High Point, NC (US); Wesley Chominsky, Greensboro, NC (US); Eric M Bernhart, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 352 days.

(21) Appl. No.: 12/448,543

(22) PCT Filed: Feb. 19, 2007

(86) PCT No.: PCT/US2007/004561
§ 371 (c)(1),
(2), (4) Date: Jun. 24, 2009

(87) PCT Pub. No.: WO2008/085184
PCT Pub. Date: Jul. 17, 2008

(65) Prior Publication Data
US 2010/0085172 A1  Apr. 8, 2010

(51) Int. Cl.
*G08B 21/00* (2006.01)
*B60Q 1/00* (2006.01)
*B60T 13/74* (2006.01)

(52) U.S. Cl. ............. 340/431; 340/450.1; 340/452; 340/687; 180/290; 303/3; 303/124; 307/9.1; 280/446.1

(58) Field of Classification Search ............. 340/431, 340/687
See application file for complete search history.

(56) References Cited

U.S. PATENT DOCUMENTS

| | | |
|---|---|---|
| 5,677,667 A | 10/1997 | Lesesky |
| 5,986,544 A | 11/1999 | Kaisers |
| 7,207,588 B2 | 4/2007 | Bergum |
| 7,394,354 B2 | 7/2008 | Yu |

*Primary Examiner* — Donnie Crosland
(74) *Attorney, Agent, or Firm* — Martin Farrell; Michael Pruden

(57) ABSTRACT

Apparatus and method for detecting the connection of a trailer to a vehicle. The apparatus is connected to a pneumatic pressure line of the trailer's service braking system, and measures the pressure of the system to determine if the trailer is properly connected to the vehicle when the vehicle's engine is running. Further, the apparatus also contains an algorithm that monitors the signals from other vehicle systems, and uses that information to determine the trailer characteristics. The vehicle engine control system receives information from the apparatus and adjusts the various vehicle systems accordingly.

13 Claims, 1 Drawing Sheet

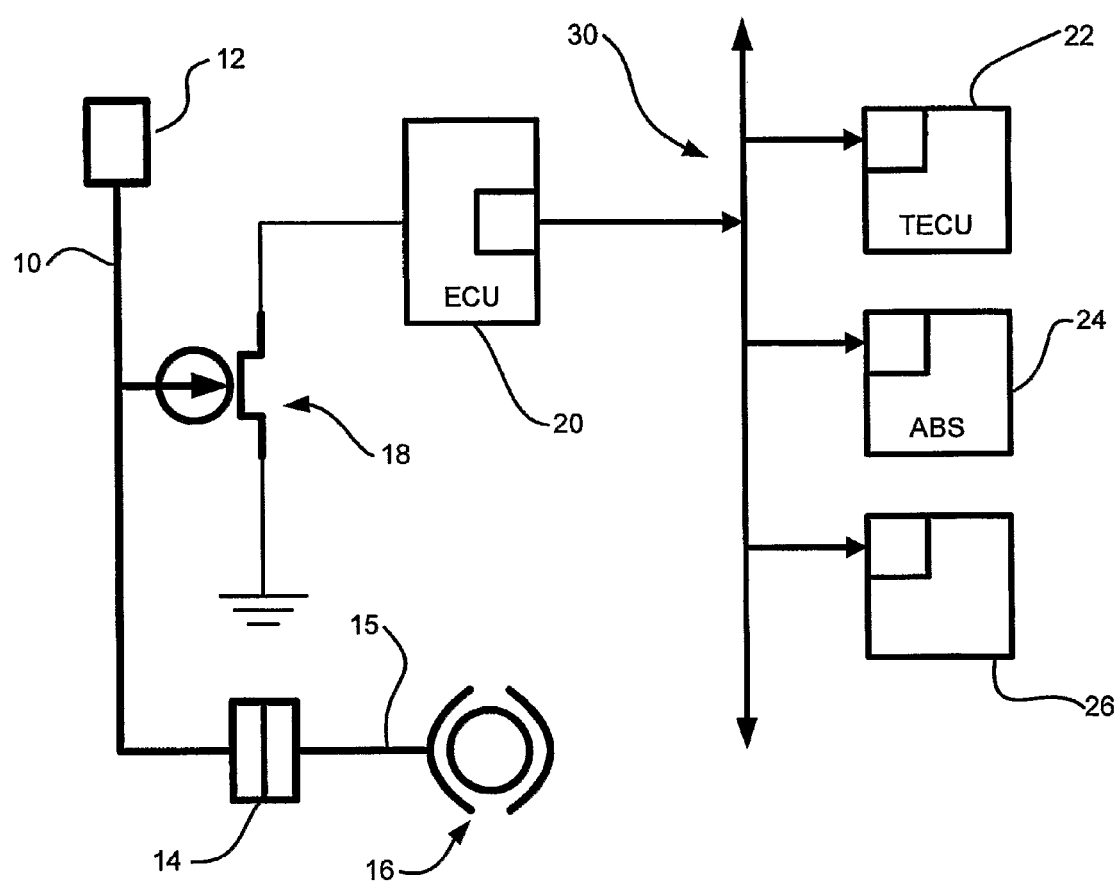

TRAILER DETECTION APPARATUS AND METHOD

FIELD OF THE INVENTION

This invention is directed to an apparatus and method for detecting the presence of a trailer attached to a motor vehicle. The invention further relates to the apparatus and method for detecting the presence of a trailer attached to a motor vehicle for the purposes of providing such information to other systems of a motor vehicle.

BACKGROUND

There are currently a variety of types of trailer detection systems. One system uses a sensor mounted on the truck's fifth wheel to detect when a trailer king pin is connected to the fifth wheel.

Another prior device is disclosed in U.S. Pat. No. 5,986,544, the disclosure of which is hereby expressly incorporated by reference. The '544 patent uses the vehicle and trailer service brake system to detect the presence of a trailer as part of an electronic brake control system. This device senses a rate of pressure buildup in the service brake system as a function of pressure modulated to a vehicle coupling that is attached to a trailer. This system monitors the service brake pedal and repeats the detection every time the pedal is operated by the driver.

There is a need for improvement in trailer detection to simply and always indicate to the operator the presence of a trailer attached to the vehicle and to ensure safe operation of the vehicle attached to the trailer.

SUMMARY

An object of the presently disclosed solution is to provide an apparatus and method for detecting whether a trailer is connected to a vehicle.

One embodiment of the invention discloses a trailer detection system containing a control module connected to a pressure switch. The pressure switch is functionally integrated with the vehicle's park brake system to monitor air pressure status at the coupling for a trailer. The control module interprets the signals from the pressure switch, processes the data into a J1939 message, and disperses that message to various vehicle systems, such as the anti-lock braking system (ABS), electronic stability control system (ECS), and the transmission.

Another embodiment of the invention discloses a trailer detection system containing a control module connected to a pressure switch. The switch is attached to the vehicle's park brake system to monitor air pressure status. The control module interprets the signals from the pressure switch, processes the data into a J1939 message, and disperses that message to various vehicle systems, such as the anti-lock braking system (ABS), electronic stability control system (ECS), and the transmission.

Another embodiment of the invention discloses a trailer detection system containing a control module connected to a pressure switch. The switch is attached to the vehicle's park brake system to monitor air pressure status in a coupling for a trailer. The control module interprets the signals from the pressure switch, processes the data into a J1939 message, and disperses that message to various vehicle systems, such as the anti-lock braking system (ABS), electronic stability control system (ECS), and the transmission. The system monitors the trailer park brake to determine if it is engaged, so as to prevent the vehicle from dragging the trailer with the park brake engaged, which is an unsafe driving condition.

Another embodiment of the invention discloses a trailer detection system containing a control module connected to a pressure switch. The switch is attached to the vehicle's park brake system to monitor air pressure status in a coupling for a trailer. The control module interprets the signals from the pressure switch, processes the data into a J1939 message, and disperses that message to various vehicle systems, such as the anti-lock braking system (ABS), electronic stability control system (ECS), and the transmission. The trailer detection system communicates to the transmission a signal indicating whether a trailer is connected to the vehicle for use in selecting a gear of the transmission.

Another object of the present invention is to provide an apparatus and method for detecting whether a trailer is connected to a vehicle wherein the determination of the presence of a trailer is communicated to various vehicle systems.

Another embodiment of the present invention is that the apparatus determines whether a trailer is present at a vehicle speed threshold, and communicates that information to various vehicle systems. Above the speed threshold, the apparatus maintains the determined trailer connection status.

Another embodiment of the present invention includes the monitoring of the park brake system pressure by the apparatus and interprets this information, along with other information, that a trailer is attached to the vehicle.

Another embodiment of the present invention includes the monitoring of the parking brake position and communicating that information to various vehicle systems.

BRIEF DESCRIPTION OF THE DRAWINGS

The sole FIGURE is a schematic block diagram showing an example of a vehicle trailer detection system according to one embodiment of the invention.

DETAILED DESCRIPTION

The FIGURE illustrates one exemplary implementation of the presently disclosed invention. An air line 10 that delivers compressed air from the vehicle compressed air supply 12 is shown connected to trailer park brake 16. A coupling 14 connects the vehicle air line 10 and a trailer system air line 15. A pressure switch 18 is interposed in the air line 10. Pressure switch 18 is connected electronically to a vehicle electronic control unit (ECU) 20, which receives a signal from pressure switch 18 in accordance with the air pressure in line 10 and determines from this signal whether a trailer (not shown) is connected and in a state that is safe for vehicle operation. The ECU 20 communicates with various other vehicle control units over the vehicle CAN bus 30. These control units, for example, may include a transmission shift ECU 22, an ABS/EBS (Antilock Brake System/Electronic Brake System) controller 24, or another vehicle control module 26, to provide information regarding the presence and status of the trailer.

The vehicle display panel, or dashboard, may be equipped with indicator lights and audible warning devices, to alert the operator of changes in the vehicle condition or of items that require the operator's attention. The present invention may include a warning element that uses one or a combination of an audible warning and/or a visual warning that a trailer detection event has occurred. This warning will prevent the driver from operating the vehicle when the trailer is improperly attached to the vehicle, or is not in a state for safe operation of the vehicle.

The trailer park brake is applied by default when the air pressure of the trailer's air brake system is below a certain threshold. Conversely, when the pressure of air line 1 is at least equal to the threshold, the trailer's park brake system is pressurized, the trailer park brake is released, and the vehicle is ready to move. Monitoring the pressure in the park brake supply line for the trailer can therefore indicate whether a trailer is connected.

As an example, the trailer park brake may be released when the air pressure in the trailer's pneumatic braking system pressure reaches 20 psi; this will occur when the trailer is properly connected to the vehicle, the vehicle engine is started and the vehicle's compressed air supply pressurizes the service brake system. For this description, the value of 20 psi is used in an exemplary manner; those skilled in the art will understand that other pressure values may be selected. This value may be below the pressure value of the fully pressurized system:

According to the invention, pressure switch 18 may be an "on/off" type switch that applies a binary signal to the electronic control unit indicating whether the service brake system pressure is below or above a threshold. In such case, when the pressure of air line 1 is less than 20 psi, normally closed pressure switch 18 remains closed, which causes a logical low or "0" signal to be inputted to the electronic control unit 20. This "0" signal indicates to the ECU 20 that a connected trailer's parking brakes are applied or that the trailer is not connected to the vehicle.

When the air pressure is greater than 20 psi, the pressure switch 18 opens, causing a logical high or "1" signal to be inputted to the ECU 20. This "1" signal indicates that the trailer is connected to the vehicle, that the trailer's park brake system is pressurized and the trailer's parking brakes are released, and that the vehicle, together with the trailer, is ready to move.

Alternatively, the pressure switch 18 may be an analog transducer that converts air pressure to an electrical voltage level, and thereby provides a measurement of the actual air pressure level in the park brake system to the ECU 20.

The air pressure information as communicated by the signals from the pressure switch 18 is processed by the ECU 20 and transformed into a J1939 message, which is relayed to a variety of vehicle control units, or processing modules over the vehicle CAN bus 30 or equivalent system. These processing modules control other vehicle functions, such as the transmission, engine, antilock braking, stability control, speed control, and the like.

Because the air pressure level is analog in nature, it must be assured that the system operates properly while the pressure level is in a transition from a "no pressure" state to a "pressurized" state. There are several variables to be considered in the transitional state: the variability of pneumatic system pressure levels, system length, and brake design; the tolerance of the pressure switch; and driving habits of the vehicle operator. A filter may be used on the pressure signal to accommodate transient variations in the signal and prevent a false reading.

The pressure switch 18 may be selected in accordance with the specific vehicle system parameters such that no modifications to the trailer detection function are required. The tolerance of the pressure switch may have an impact on the delay time of the detection function caused by the conversion of air pressure to voltage level at the switch, but much less of an impact for functions such as gear shifting because of the pressure levels and corresponding braking forces present when the trailer detection function is used for gear shifting functions.

As mentioned, when the pressure in air line 10 is below the predetermined threshold, it can be inferred that a trailer is connected with the park brake of the trailer applied or that a trailer is not connected. When a trailer is connected, line pressure below the threshold indicates that it is not safe to move the vehicle. If no trailer is connected, there is no issue in moving the vehicle. This creates an ambiguity which may be resolved as described below.

When the vehicle launches, that is, starts from a stop, with the trailer connection status at "0" indicating a connected trailer with park brake engaged or no connected trailer, the system monitors the vehicle speed. If the vehicle speed reaches an acceleration threshold, for example 15 kph, which is a practical indication that there is no trailer connected, the system generates a signal indicating that no trailer is connected. This status is maintained until the vehicle speed drops below a deceleration threshold, which may be different than the acceleration threshold. From a practical standpoint, it is not likely that a trailer will be connected to moving tractor. Once the vehicle passes the deceleration threshold, the trailer connection monitoring resumes.

A related process is used when the system detects a trailer connected to the vehicle. Following vehicle launch, once the vehicle reaches an acceleration threshold, which may also be 15 kph, trailer monitoring is discontinued and the trailer status as connected is frozen or maintained until the vehicle speed falls below a deceleration threshold. At that point, trailer detection resumes, however, the trailer connection status as connected is maintained. If the vehicle stops and the park brake is applied, the trailer status becomes indeterminate, as mentioned above, as the park brake pressure below the threshold may indicate that the trailer has been unhitched. At the next launch, the system will monitor for trailer connection, but will continue the previous status of trailer connected. This may be important to protect the transmission in cases where the vehicle driver selects a gear before releasing the park brake. The gear selection may not be appropriate for a vehicle with a trailer connected, which could overload the transmission.

If the park brake is released, the system will receive a signal indicating a connected trailer. On the other hand, if the vehicle reaches the acceleration threshold without receiving a connected trailer indication, the system will assume that no trailer is connected and generate an appropriate signal.

The trailer connection status signal is communicated to the vehicle's transmission controller with automatic or semiautomatic transmissions for use in selecting a gear. This may be affected by the vehicle operator driving habits, for example, the operator's discretion in timing of gear shift lever engagement. Gear shift lever engagement may done by the operator after the trailer park brake has been released (case A), or before the trailer park brake is released (case B). In either case, it is assumed for the purposes of this description that a trailer has been connected to the vehicle mechanically (fifth wheel is hitched) and electrically and pneumatically. In addition, the engine has been started and is idling.

In case A, the driver releases the park brake before operating the gear shift lever. With the park brake released, the system will detect and indicate that a trailer is present. The trailer detect indication is used by the TECU 22 to make a starting gear shift decision when the driver subsequently operates the gear shift lever to put the transmission in gear. Thus, the park brake release will indicate the presence of the trailer (when properly connected) before the TECU 22 is prompted to make the starting gear shift decision. Consequently, proper transmission engagement is assured as the operator will have engaged starting gear after indication of the trailer connection status.

In case B, the driver first operates the gear shift lever to put the transmission into gear. The TECU 22 receives a "trailer not connected signal" thus will not make a gear shift decision. This delay continues until the driver releases the park brake and the park brake system pressure builds up to the predetermined threshold, such that the TECU 22 receives a "connected" signal and can make a starting gear shift decision. This may cause a delay in vehicle launch depending on transmission design.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the claims.

What is claimed is:

1. An apparatus for detecting the connection of a trailer to a motor vehicle, comprising:
    a pressure switch responsive to air pressure magnitude in a pneumatic park brake system of said trailer for developing a signal indicative thereof;
    an electronic control unit receiving a signal from said pressure switch and determining therefrom whether a trailer is connected to said vehicle, said electronic control unit sending at least one vehicle operational instruction to at least one other vehicle operation control module as a function of whether said electronic control unit has determined that a trailer is connected or is not connected to said vehicle.

2. The apparatus as recited in claim 1, further comprising an indicator lamp in a vehicle control panel indicating to an operator whether a trailer is connected to said vehicle.

3. The apparatus as recited in claim 1, further comprising an audible indicator in a vehicle control panel indicating to an operator whether a trailer is connected to said vehicle.

4. The apparatus as recited in claim 1, wherein said electronic control unit sends the operational instruction to a vehicle transmission controller.

5. The apparatus as recited in claim 1, wherein said electronic control unit sends the operational instruction to a vehicle service brake controller.

6. The apparatus as recited in claim 1, wherein said electronic control unit sends the operational instruction to a vehicles stability control controller.

7. The apparatus as recited in claim 1, further comprising means for storing a trailer connection status, which means is triggered by said vehicle reaching a speed threshold.

8. A method of detecting the presence of a trailer attached to a vehicle, the method comprising the steps of:
    detecting the pressure of a pneumatic park brake system of said trailer and developing a first signal indicating whether said park brake system is pressurized or is not pressurized; and
    communicating vehicle operational instructions to at least one of a trailer control unit, antilock brake system unit, transmission control unit, and electronic stability control unit based on said detected signal.

9. The method as recited in claim 8, further comprising communicating said determination to an electronic control unit of said vehicle.

10. The method as recited in claim 8, further comprising communicating said determination to a control panel of said vehicle for one of an audible and visual presentation to an operator.

11. The method as recited in claim 8, further comprising generating a second signal representing whether a trailer is connected to the vehicle based on the first signal indicating whether the park brake system is pressurized.

12. The method as recited in claim 11, further comprising the steps of:
    monitoring a vehicle speed;
    storing the second signal when the vehicle speed reaches a predetermined threshold; and,
    maintaining the second signal as the trailer connection status until the vehicle speed drops below a predetermined threshold.

13. The method as recited in claim 8, further comprising the steps of:
    generating a first signal that the park brake system is not pressurized;
    monitoring a vehicle speed from launch; and,
    generating a second signal indicating that no trailer is connected when the vehicle reaches a predetermined speed.

* * * * *